(12) United States Patent
Li et al.

(10) Patent No.: US 9,686,546 B2
(45) Date of Patent: Jun. 20, 2017

(54) SWITCHING BETWEEN STREAMING VIDEO BITSTREAMS

(71) Applicant: Microsoft Corporation, Redmond, WA (US)

(72) Inventors: Shipeng Li, Irvine, CA (US); Feng Wu, Beijing (CN); Xiaoyan Sun, Beijing (CN); Guobin Shen, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 855 days.

(21) Appl. No.: 14/071,540

(22) Filed: Nov. 4, 2013

(65) Prior Publication Data

US 2014/0086308 A1 Mar. 27, 2014

Related U.S. Application Data

(60) Continuation of application No. 12/472,266, filed on May 26, 2009, now Pat. No. 8,576,919, which is a
(Continued)

(51) Int. Cl.
*H04N 7/12* (2006.01)
*H04N 11/02* (2006.01)
(Continued)

(52) U.S. Cl.
CPC ..... *H04N 19/00812* (2013.01); *H04N 19/126* (2014.11); *H04N 19/577* (2014.11);
(Continued)

(58) Field of Classification Search
CPC ... H04N 19/126; H04N 19/30; H04N 21/2662
(Continued)

(56) References Cited

U.S. PATENT DOCUMENTS 5,742,343 A * 4/1998 Haskell ................. H04N 19/61
348/487
5,887,110 A 3/1999 Sakamoto et al.
(Continued)

FOREIGN PATENT DOCUMENTS

EP 1331822 7/2003
JP 08-242451 9/1996
(Continued)

OTHER PUBLICATIONS

Advisory Action dated Jun. 7, 2011, from U.S. Appl. No. 11/280,095, 2 pp.
(Continued)

*Primary Examiner* — Jeremaiah C Hallenbeck-Huber
(74) *Attorney, Agent, or Firm* — Klarquist Sparkman, LLP

(57) ABSTRACT

Improved methods and apparatuses are provided for switching of streaming data bitstreams, such as, for example, used in video streaming and other related applications. Some desired functionalities provided herein include random access, fast forward and fast backward, error-resilience and bandwidth adaptation. The improved methods and apparatuses can be configured to increase coding efficiency of and/or reduce the amount of data needed to encode a switching bitstream.

20 Claims, 9 Drawing Sheets

Related U.S. Application Data division of application No. 10/185,741, filed on Jun. 27, 2002, now abandoned.

(60) Provisional application No. 60/355,071, filed on Feb. 8, 2002.

(51) Int. Cl.

| | | |
|---|---|---|
| *H04N 11/04* | (2006.01) | |
| *H04N 19/625* | (2014.01) | |
| *H04N 21/234* | (2011.01) | |
| *H04N 21/2343* | (2011.01) | |
| *H04N 21/2662* | (2011.01) | |
| *H04N 19/61* | (2014.01) | |
| *H04N 19/126* | (2014.01) | |
| *H04N 19/577* | (2014.01) | |

(52) U.S. Cl.
CPC ........... *H04N 19/61* (2014.11); *H04N 19/625* (2014.11); *H04N 21/23424* (2013.01); *H04N 21/23439* (2013.01); *H04N 21/2662* (2013.01)

(58) Field of Classification Search
USPC .................................................. 375/240.25
See application file for complete search history.

(56) References Cited

U.S. PATENT DOCUMENTS

| | | | | |
|---|---|---|---|---|
| 6,097,842 | A * | 8/2000 | Suzuki | H04N 19/52 375/E7.081 |
| 6,208,671 | B1 | 3/2001 | Paulos et al. | |
| 6,208,691 | B1 | 3/2001 | Balakrishnan et al. | |
| 6,292,512 | B1 | 9/2001 | Radha et al. | |
| 6,480,541 | B1 * | 11/2002 | Girod | H04N 9/8042 375/240.12 |
| 6,700,933 | B1 | 3/2004 | Wu et al. | |
| 6,795,501 | B1 | 9/2004 | Zhu | |
| 6,920,175 | B2 | 7/2005 | Karczewicz et al. | |
| 6,996,173 | B2 | 2/2006 | Wu et al. | |
| 7,830,958 | B2 | 11/2010 | Wu et al. | |
| 8,005,138 | B2 | 8/2011 | Wu et al. | |
| 8,576,919 | B2 | 11/2013 | Li et al. | |
| 2002/0054640 | A1 | 5/2002 | Boon | |
| 2002/0064177 | A1 | 5/2002 | Bertram et al. | |
| 2002/0071485 | A1 | 6/2002 | Caglar et al. | |
| 2002/0118755 | A1 * | 8/2002 | Karczewicz | H04N 21/23424 375/240.16 |
| 2002/0122491 | A1 * | 9/2002 | Karczewicz | H04N 21/23424 375/240.25 |
| 2003/0067872 | A1 | 4/2003 | Harrell et al. | |
| 2003/0138042 | A1 | 7/2003 | Chen et al. | |
| 2003/0138142 | A1 | 7/2003 | Hung | |
| 2003/0151753 | A1 | 8/2003 | Li et al. | |
| 2003/0206659 | A1 | 11/2003 | Hamanaka | |
| 2004/0157555 | A1 | 8/2004 | Richenstein et al. | |
| 2004/0198237 | A1 | 10/2004 | Abutaleb et al. | |
| 2005/0002458 | A1 | 1/2005 | Bruls et al. | |
| 2005/0135477 | A1 | 6/2005 | Zhang et al. | |
| 2008/0215777 | A1 | 9/2008 | Richenstein et al. | |

FOREIGN PATENT DOCUMENTS

| | | |
|---|---|---|
| JP | 11-252546 | 9/1999 |
| JP | 2001-186519 | 7/2001 |
| JP | 2003-244700 | 8/2003 |
| WO | WO 00/62552 | 10/2000 |

OTHER PUBLICATIONS

Conklin et al., "Video Coding for Streaming Media Delivery on the Internet," *IEEE Trans. on Circuits and Systems for Video Technology*, vol. 11, No. 3, pp. 269-281 (Mar. 2001).

Final Office action dated Jul. 31, 2006, from U.S. Appl. No. 10/185,741, 7 pp.
Final Office action dated Jun. 14, 2007, from U.S. Appl. No. 10/185,741, 8 pp.
Final Office action dated Sep. 3, 2008, from U.S. Appl. No. 10/185,741, 13 pp.
Final Office action dated Mar. 31, 2011, from U.S. Appl. No. 11/280,095, 10 pp.
Girod et al., "Internet Video-Streaming," *Telecommunication Laboratory*, 10 pp. (1998).
Hallapuro et al., "Low Complexity Transform and Quantization—Part I: Basic Implementation," JVT-B038, 18 pp. (Feb. 2002).
ISO/IEC, "Information Technology—Coding of Audio-Visual Objects: Visual," ISO/IEC 14496-2, Committee Draft, 327 pp. (Mar. 1998).
Karczewicz et al., "A Proposal for SP-Frames," ITU VCEG-L27, 9 pp. (Jan. 2001).
Kurceren et al., "Improved SP-Frame Encoding," VCEG-M73, 5 pp. (Apr. 2001).
Kurceren et al., "SP-frame demonstrations," ITU VCEG-N42, 4 pp. (Sep. 2001).
Notice of Allowance dated Jan. 11, 2010, from Korean Patent Application No. 10-2003-7895, 3 pp.
Notice of Allowance dated Sep. 27, 2005, from U.S. Appl. No. 10/186,298, 4 pp.
Notice of Alowance dated Jun. 24, 2011, from U.S. Appl. No. 11/280,095, 5 pp.
Notice of Allowance dated Jul. 28, 2010, from U.S. Appl. No. 11/280,619, 12 pp.
Notice of Final Rejection dated Sep. 15, 2009, from Japanese Patent Application No. 2003-018057, 5 pp.
Notice of Rejection dated Mar. 6, 2009, from Japanese Patent Application No. 2003-032872, 10 pp.
Notice of Rejection dated May 1, 2009, from Japanese Patent Application No. 2003-018057, 4 pp.
Office action dated Feb. 9, 2006, from U.S. Appl. No. 10/185,741, 7 pp.
Office action dated Nov. 15, 2006, from U.S. Appl. No. 10/185,741, 7 pp.
Office action dated Feb. 25, 2008, from U.S. Appl. No. 10/185,741, 9 pp.
Office action dated Feb. 25, 2010, from European Application No. 02028649.8, 6 pp.
Office action dated Jan. 26, 2009, from U.S. Appl. No. 10/185,741, 19 pp.
Office action dated Nov. 12, 2009, from European Patent Application No. 03000607.6, 7 pp.
Office action dated Novmeber 28, 2011, from European Patent Application No. 03000607.6, 8 pp.
Office action dated Jun. 28, 2005, from U.S. Appl. No. 10/186,298, 16 pp.
Office action dated Sep. 23, 2010, from U.S. Appl. No. 11/280,095, 16 pp.
Search Report dated Nov. 13, 2003, from European Patent Application No. 03000607.6, 4 pp.
Shenoy et al., "Efficient Support for Scan Operations in Video Servers," *Proc. of ACM Multimedia*, 10 pp. (Nov. 1995).
Sun et al., "Efficient and Flexible Drift-Free Video Bitstream Switching at Predictive Frames," *IEEE Int'l Conf. on Multimedia and Expo*, pp. 541-544 (2002).
Sun et al., "Improved SP coding technique," JVT-B097, 11 pp. (Jan. 2002).
Sun et al., "Seamless Switching of Scalable Video Bitstreams for Efficient Streaming," Dept. Computer Application, Harbin Inst. Tech., 4 pp. (May 2002).
Sun et al., "Seamless Switching of Scalable Video Bitstreams for Efficient Streaming," *IEEE Int'l Symp. on Circuits and Systems*, 4 pp. (May 2002).
Wiegand, "Working Draft No. 2, Revision 0 (WD-2)," JVT-B118, 105 pp. (Dec. 2001).
Wu et al., "A Framework for Efficient Progressive Fine Granularity Scalable Video Coding," *IEEE Trans. on Circuits and Systems for Video Technology*, vol. 11, No. 3, pp. 332-344 (Mar. 2001).

(56) References Cited

OTHER PUBLICATIONS

Wu et al., "The Core Experiment on the SP Frame coding," JVT-B112, 45 pp. (Feb. 2002).

* cited by examiner

SWITCHING BETWEEN STREAMING VIDEO BITSTREAMS

RELATED PATENT APPLICATIONS

This U.S. Non-provisional patent application is a Continuation of U.S. Non-provisional patent application Ser. No. 12/472,266, filed May 26, 2009, which is a Divisional of U.S. Non-provisional patent application Ser. No. 10/185,741, filed Jun. 27, 2002, which claims the benefit of priority under 35 U.S.C. §119(e) from U.S. Provisional Application Ser. No. 60/355,071, filed Feb. 8, 2002. U.S. Non-Provisional patent application Ser. No. 12/472,266, U.S. Non-Provisional patent application Ser. No. 10/185,741, and U.S. Provisional Application Ser. No. 60/355,071 are herein incorporated by reference in their entirety.

This U.S. Non-provisional application is related to U.S. Pat. No. 6,996,173, filed Jun. 27, 2002, issued Feb. 7, 2006, and titled "Seamless Switching of Scalable Video Bitstreams."

BACKGROUND

With steady growth of access bandwidth, more and more Internet applications start to use streaming audio and video contents. Since the current Internet is inherently a heterogeneous and dynamical best-effort network, channel bandwidth usually fluctuates in a wide range from bit rate below 64 kbps to well above 1 Mbps. This brings great challenges to video coding and streaming technologies in providing a smooth playback experience and best available video quality to the users. To deal with the network bandwidth variations, two main approaches, namely, switching among multiple non-scalable bitstreams and streaming with a single scalable bitstream, have been extensively investigated in recent years.

In the first approach, a video sequence is compressed into several non-scalable bitstreams at different bit rates. Some special frames, known as key frames, are either compressed without prediction or coded with an extra switching bitstream. Key frames provide access points to switch among these bitstreams to fit in the available bandwidth. One advantage of this method is the high coding efficiency with non-scalable bitstreams. However, due to limitation in both the number of bitstreams and switching points, this method only provides coarse and sluggish capability in adapting to channel bandwidth variations.

In the second approach, a video sequence is compressed into a single scalable bitstream, which can be truncated flexibly to adapt to bandwidth variations. Among numerous scalable coding techniques, MPEG-4 Fine Granularity Scalable (FGS) coding has become prominent due to its fine-grain scalability. Since the enhancement bitstream can be truncated arbitrarily in any frame, FGS provides a remarkable capability in readily and precisely adapting to channel bandwidth variations. However, low coding efficiency is the vital disadvantage that prevents FGS from being widely deployed in video streaming applications. Progressive Fine Granularity Scalable (PFGS) coding scheme is a significant improvement over FGS by introducing two prediction loops with different quality references. On the other hand, since only one high quality reference is used in enhancement layer coding, most coding efficiency gain appears within a certain bit rate range around the high quality reference. Generally, with today's technologies, there is still a coding efficiency loss compared with the non-scalable case at fixed bit rates.

Nevertheless, bandwidth fluctuations remain a problem for streaming video in the current Internet. Conventional streaming video systems typically try to address this problem by switching between different video bitstreams with different bit-rates, for example, as described above. However, in these and other existing video coding schemes, the switching points are restricted only to key frames (e.g., typically I-frames) to avoid drifting problems. Such key frames are usually encoded far apart from each other to preserve high coding efficiency, so bitstream switching can only take place periodically. This greatly reduces the adaptation capability of existing streaming systems. Consequently, a viewer may experience frequent pausing and re-buffering when watching a streaming video.

SUMMARY

Improved methods and apparatuses are provided for switching of streaming data bitstreams, such as, for example, used in video streaming and other related applications. Some functionalities provided herein include random access, fast forward and fast backward, error-resilience and bandwidth adaptation. The improved methods and apparatuses can be configured to increase coding efficiency of and/or reduce the amount of data needed to encode a switching bitstream.

In accordance with various embodiments, an encoding method is provided. The method includes encoding data into a first bitstream using a first quantization parameter and encoding the data into a second bitstream using a second quantization parameter that is different from the first quantization parameter. The method also includes generating an encoded switching bitstream associated with the first and second bitstreams using the first quantization parameter to support up-switching between the first and second bitstreams and using the second quantization parameter to support down-switching between the first and second bitstreams.

An exemplary apparatus includes a first bitstream encoder configured to encode data into an encoded first bitstream using a first quantization parameter and a second bitstream encoder configured to encode the data into an encoded second bitstream using a second quantization parameter that is different from the first quantization parameter. The apparatus also includes a switching bitstream encoder operatively coupled to the first bitstream encoder and the second bitstream encoder and configured to output an encoded switching bitstream that supports up-switching and down-switching between the first encoded bitstream and the second encoded bitstream based on information processed using the first and second quantization parameters.

An exemplary decoding method includes receiving at least one encoded bitstream, such as, a first bitstream that was generated using a first quantization parameter and/or a second bitstream that was generated using a second quantization parameter that is different from the first quantization parameter. The received encoded bitstream is decoded. The decoding method further includes receiving an encoded switching bitstream associated with the first and second bitstreams that was generated using the first quantization parameter to support up-switching between the first and second bitstreams and using the second quantization parameter to support down-switching between the first and second bitstreams. The method also includes decoding the received encoded switching bitstream using the first and second quantization parameters.

Another exemplary apparatus includes a first decoder configured to decode a first encoded bitstream into a decoded first bitstream using a first quantization parameter and a second decoder configured to decode a second bitstream into a decoded second bitstream using a second quantization parameter that is different from the first quantization parameter. The apparatus also includes a switching bitstream decoder that is operatively coupled to the first decoder and the second decoder and configured to output a decoded switching bitstream that supports up-switching and down-switching between the first decoded bitstream and the second decoded bitstream based on information processed using the first and second quantization parameters.

BRIEF DESCRIPTION OF THE DRAWINGS

Switching Between Streaming Video Bitstreams is illustrated by way of example and not limitation in the figures of the accompanying drawings. The same numbers are used throughout the figures to reference like components and/or features.

DETAILED DESCRIPTION

Ragip Kurceren and Marta Karczewicz, in a document titled "Improved SP-frame Encoding", VCEG-M-73, ITU-T Video Coding Experts Group Meeting, Austin, Tex., 2-4 Apr. 2001 (hereinafter simply referred to as Kurceren et al.), proposed a switching scheme that allows seamless switching between bitstreams with different bit-rate. It introduced a special frame called an SP picture that serves as a switching point in a video sequence.

Figure 2:
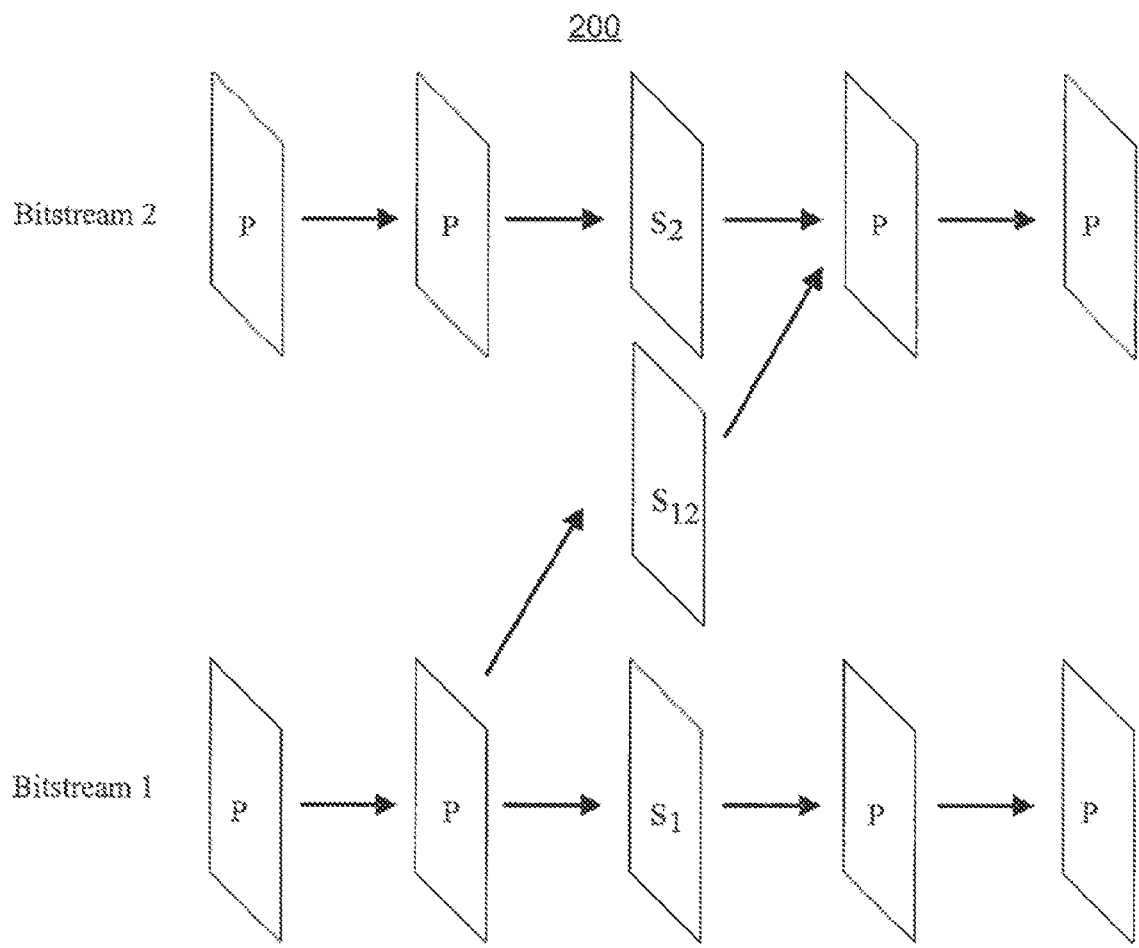
FIG. 2 is a diagram illustratively depicting switching between bitstreams, in accordance with one or more implementations.

A similar representative switching process 200 is depicted in the illustrative diagram in FIG. 2. Here, switching is shown as occurring from bitstream 1 to bitstream 2 using SP pictures.

The streaming system usually either transmits bitstream 1 or bitstream 2, for example, depending on the current channel bandwidth. However, when the channel bandwidth changes, the transmitted bitstream can be switched to a bit-rate that matches the current channel condition, for example, to improve the video quality if bandwidth increases and to maintain smooth playback if bandwidth drops.

When switching from bitstream 1 to bitstream 2, the streaming system does not need to wait for a key frame to start the switching process. Instead, it can switch at the SP frames. At SP frames, the streaming system sends a switching bitstream S12, and the decoder decodes the switching bitstream using the same techniques without knowing whether it is S1, S2 or S12. Thus, the bitstream switching is transparent to the decoder. The decoded frame will be exactly the same as the reference frame for the next frame prediction in bitstream 2. As such, there should not be any drifting problems.

Figure 3:
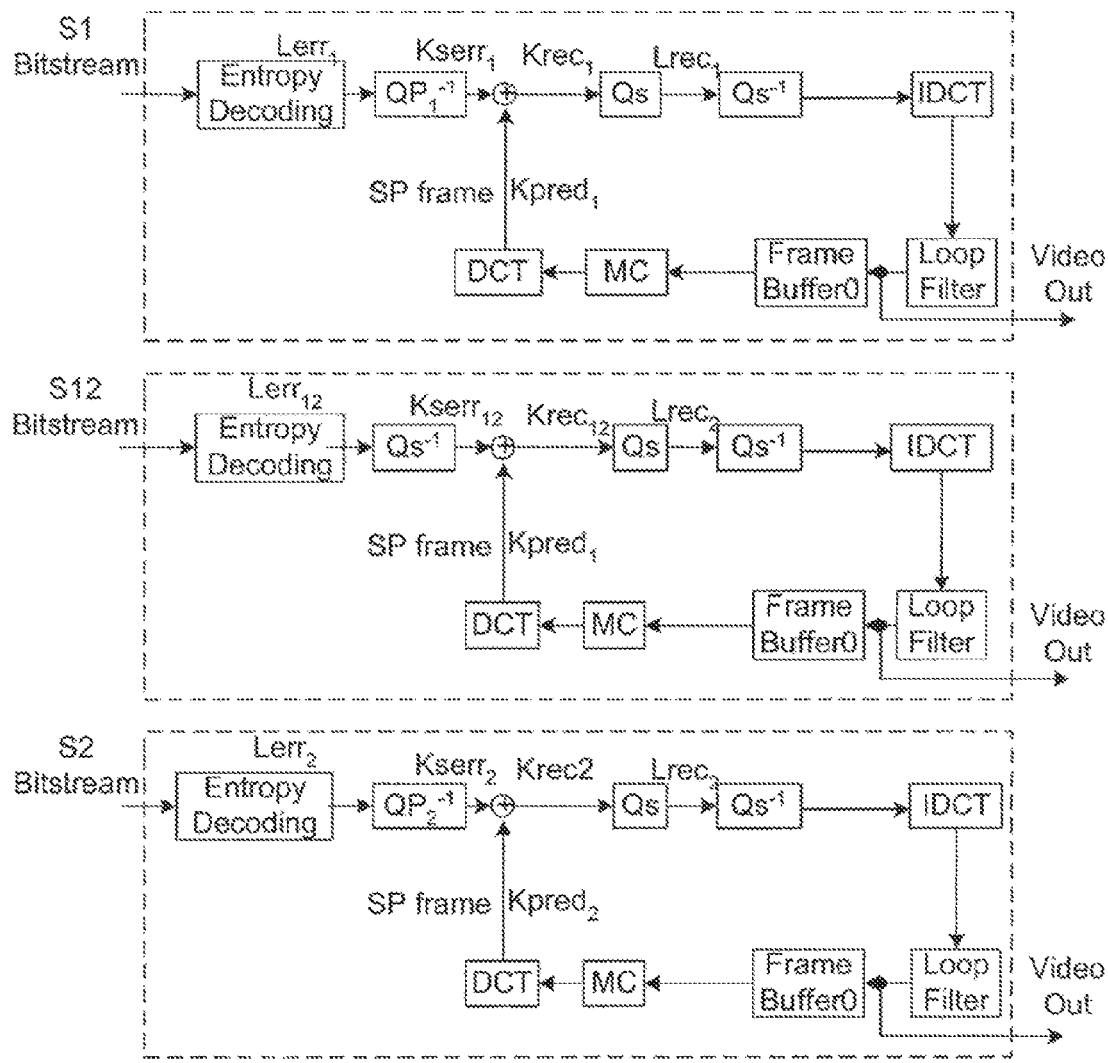
FIG. 3 is a block diagram depicting a conventional decoder.
Figure 4:
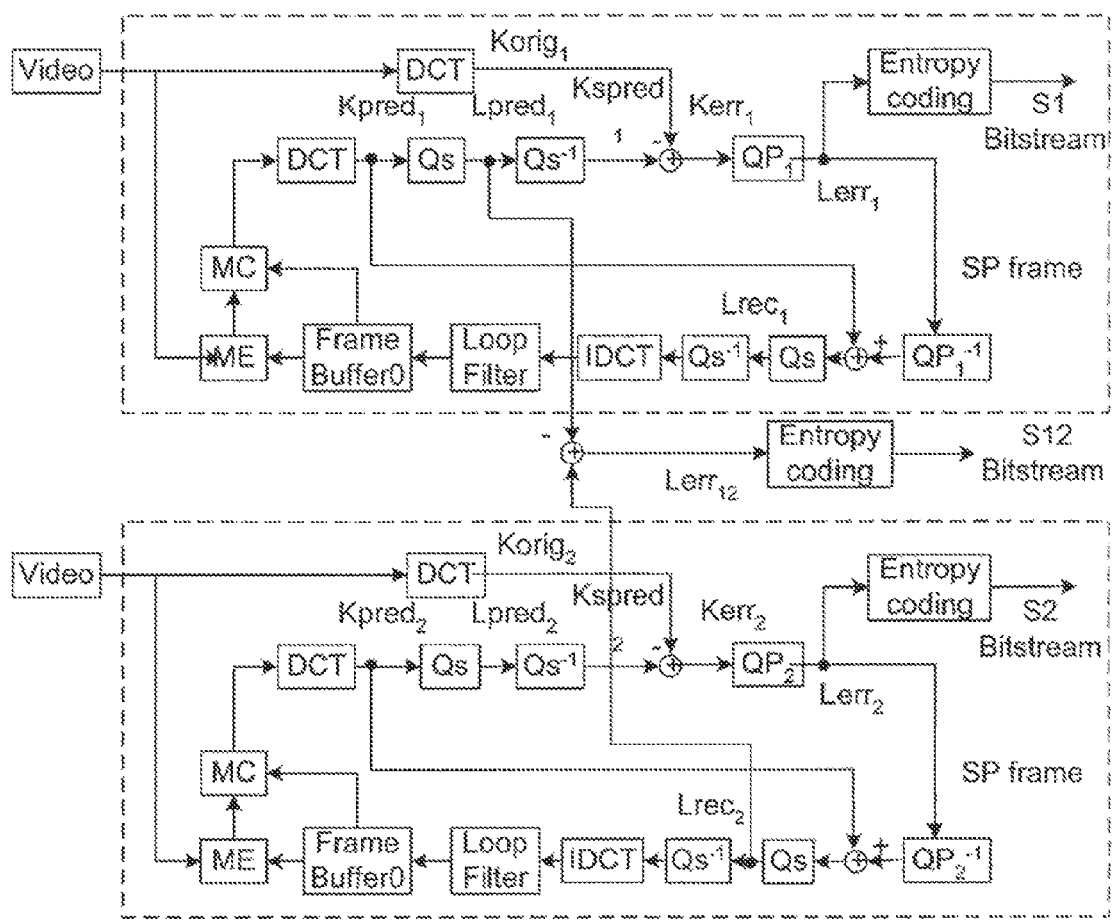
FIG. 4 is a block diagram depicting a conventional encoder.

An exemplary conventional decoder 300 and encoder 400 are depicted in FIG. 3 and FIG. 4, respectively. A more detailed description of the scheme can be found in Kurceren et al. There are some potential issues with the scheme in Kurceren et al.

For example, in real streaming applications, it is usually desirable to be able to switch down from a high bit-rate bitstream to a low bit-rate one very quickly. This is a desirable feature, for example, for TCP-friendly protocols currently used in many existing streaming systems. On the other hand, switching up from a low bit-rate video bitstream to a high bit-rate does not usually have to be done as quickly as switching down. This is again a feature of the TCP-friendly protocols, for example.

Therefore, it would be useful to support more rapid and frequent down-switching Indeed, as mentioned, the very reason for down-switching is often related to reduced/reducing channel bandwidth capabilities. The size of the down-switching bitstream may often be much smaller than that of the up-switching one. Since the high bit-rate bitstream typically contains most of the information of a low bit-rate one, in theory, one should be able to configure the scheme to make the size of switching bitstream sufficiently small.

However, the scheme in Kurceren et al. only allows the same Qs for both the down-switching bitstream and up-switching bitstream (see, e.g., FIG. 4), and the Qs is included in the prediction and reconstruction loop. The introduction of quantization Qs in the prediction and reconstruction loop will inevitably degrade the coding efficiency of the original bitstreams without SP frames. If one sets Qs too small, high coding efficiency for both bitstreams 1 and 2 can be achieved. However, the difference for down-switching is also fine-grain quantized and it would result a very large down-switching bitstream. Conversely, if one sets Qs too large, although obtaining a very compact switching bitstream, the coding efficiency of bitstreams 1 and 2 will be severely degraded, which is not desired either. It appears that this demonstrative contradiction can not be solved by the techniques proposed in Kurceren et al., which make a compromise between coding efficiency and the size of the switching bitstream.

Furthermore, there are many quantization and dequantization processes in the signal flow in the encoder proposed in Kurceren et al. (see, e.g., FIG. 4). This tends to further degrade the coding efficiency of bitstreams 1 and 2. There is also a mismatch between the prediction reference and reconstruction reference in Kurceren et al. that may contribute to the coding efficiency degradation of bitstreams 1 and 2.

Figure 5:
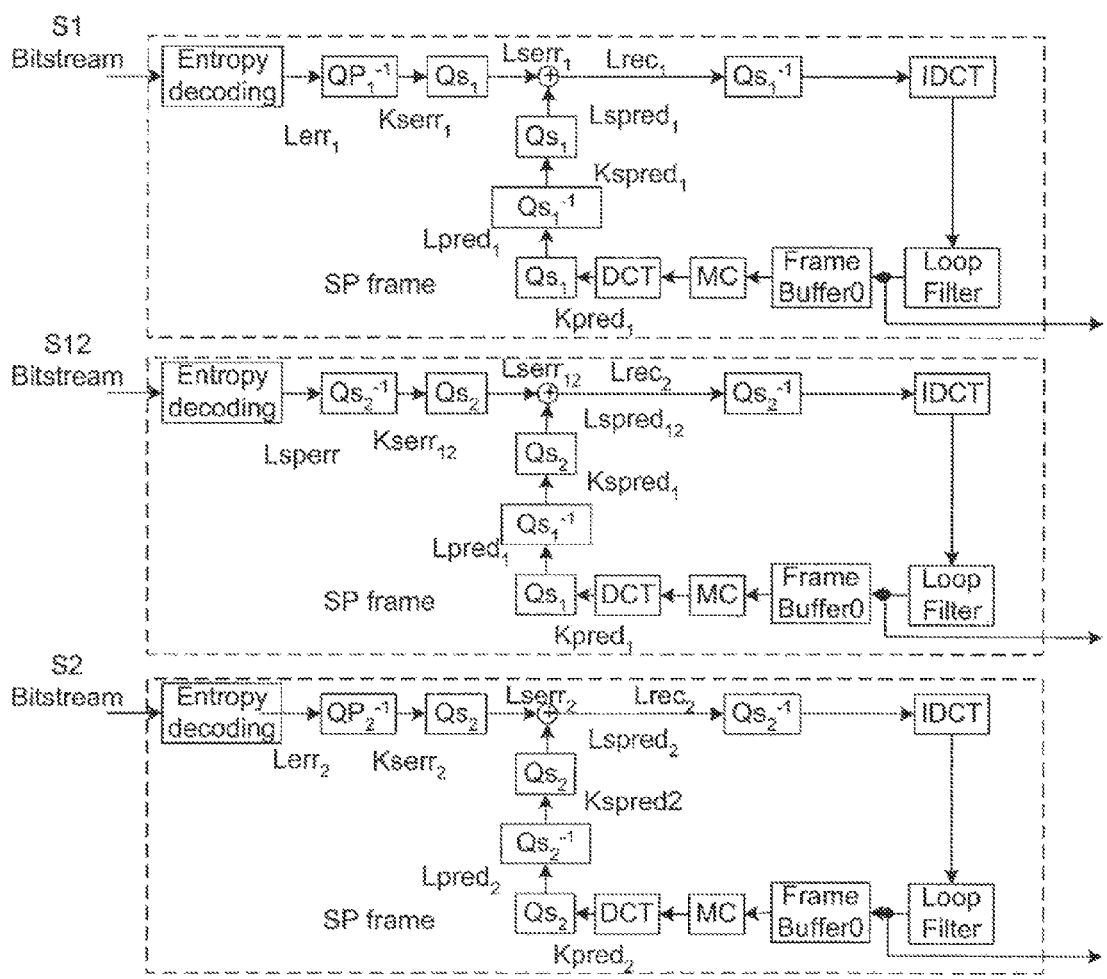
FIG. 5 is block diagram depicting an improved decoder, in accordance with one or more implementations.
Figure 6:
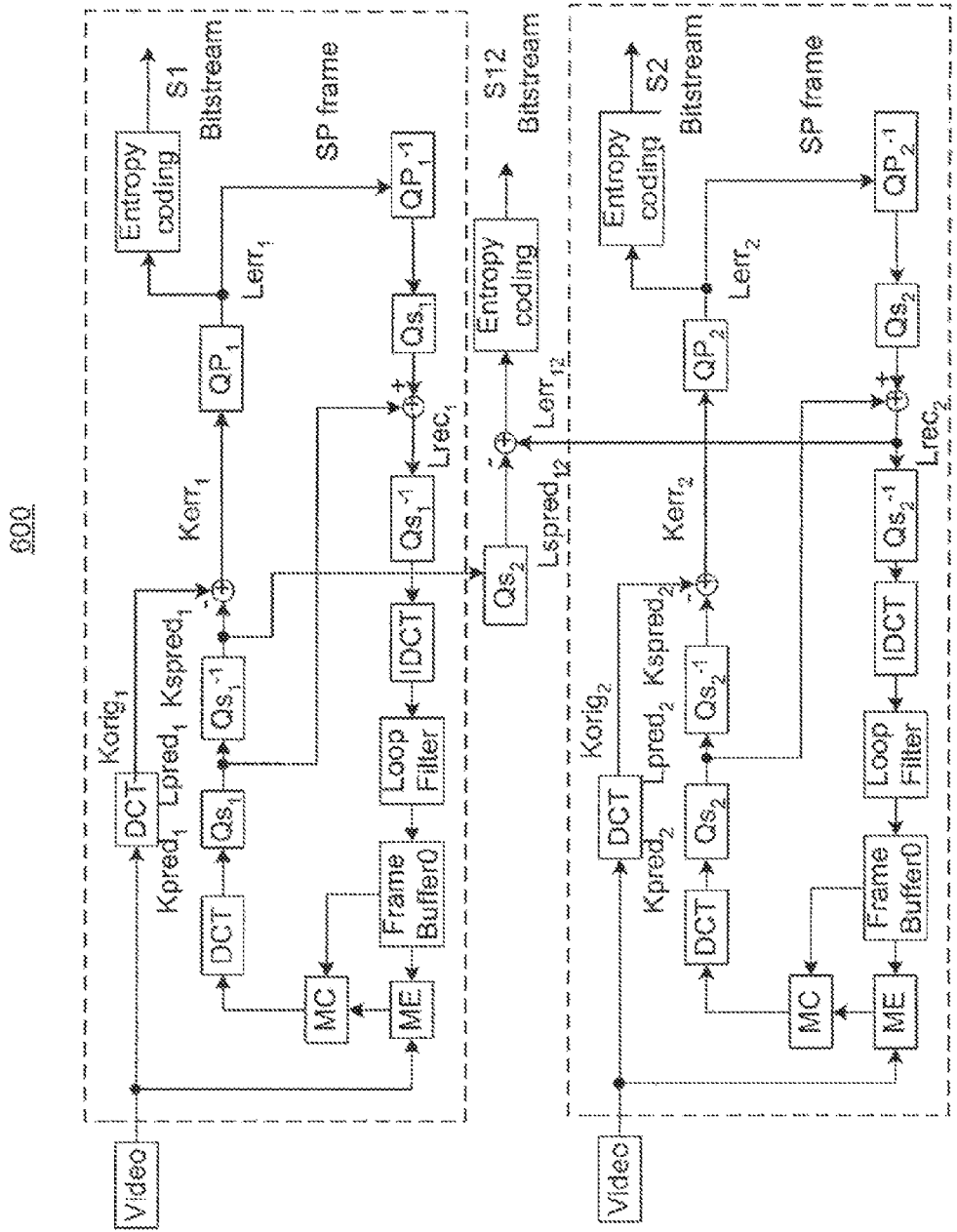
FIG. 6 is block diagram depicting an improved encoder, in accordance with one or more implementations.

In order to address these and other issues/problems improved methods and apparatuses are provided herein that allow different Qs for switching up and switching down. The block diagrams depicted in FIG. 5 and FIG. 6 illustrate an improved decoder and encoder, respectively, in accordance with one or more implementations.

In accordance with one or more implementations, the proposed techniques solve the contradiction existing in the scheme proposed in Kurceren et al. so that the down-switching bitstream can be encoded to have significantly reduced, if not minimal, size while the coding efficiency of bitstreams 1 and 2 is also well preserved.

In accordance with one or more implementations, the switching points for up-switching and down-switching can be decoupled. This means that one can encode more switching down points than switching-up points, for example, to suit the TCP-friendly protocols, etc. Moreover, such decoupling allows for further improved coding efficiency of the bitstream that the system is switched from, for example, by individually setting the Qs in the reconstruction loop to an appropriately small value.

Figure 7:
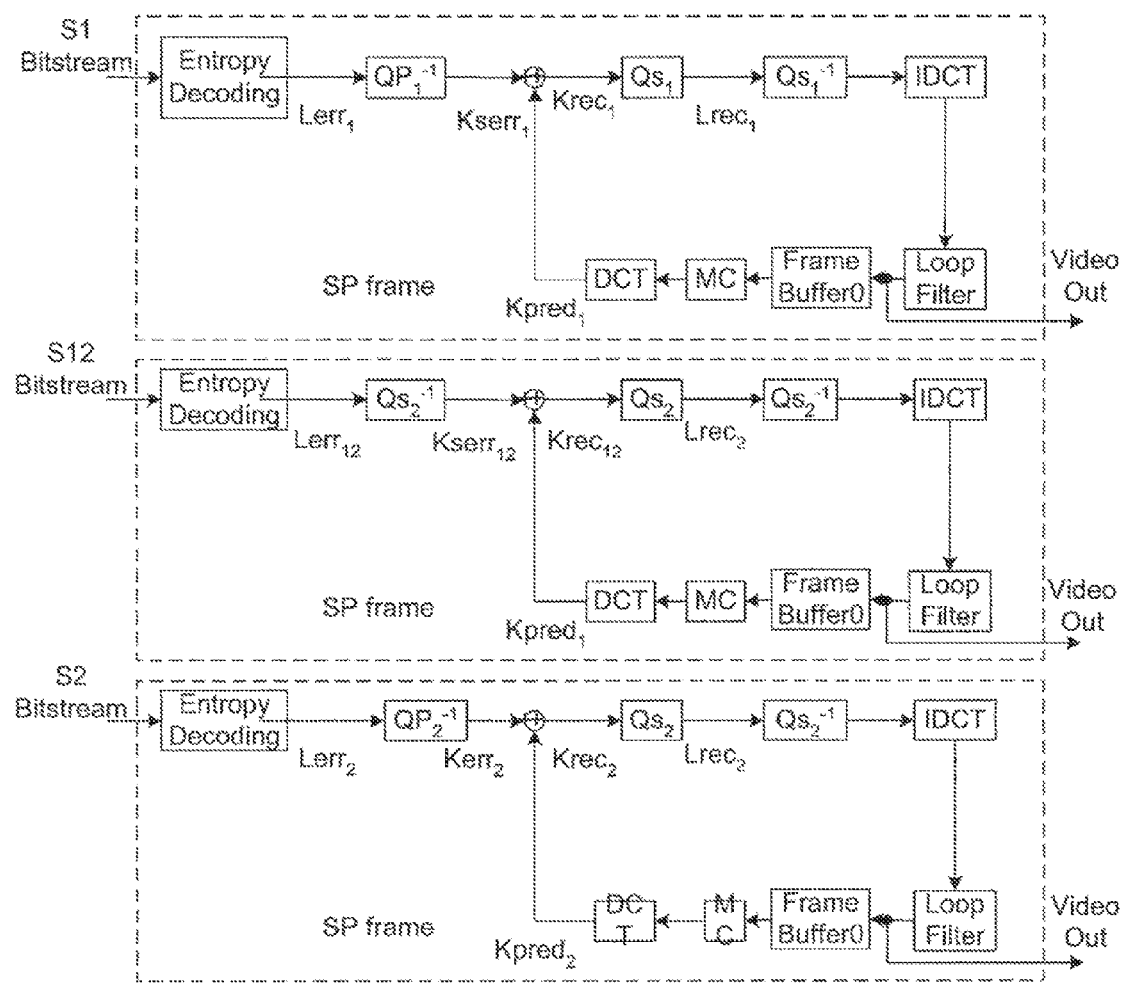
FIG. 7 is block diagram depicting an improved decoder, in accordance with one or more implementations.
Figure 8:
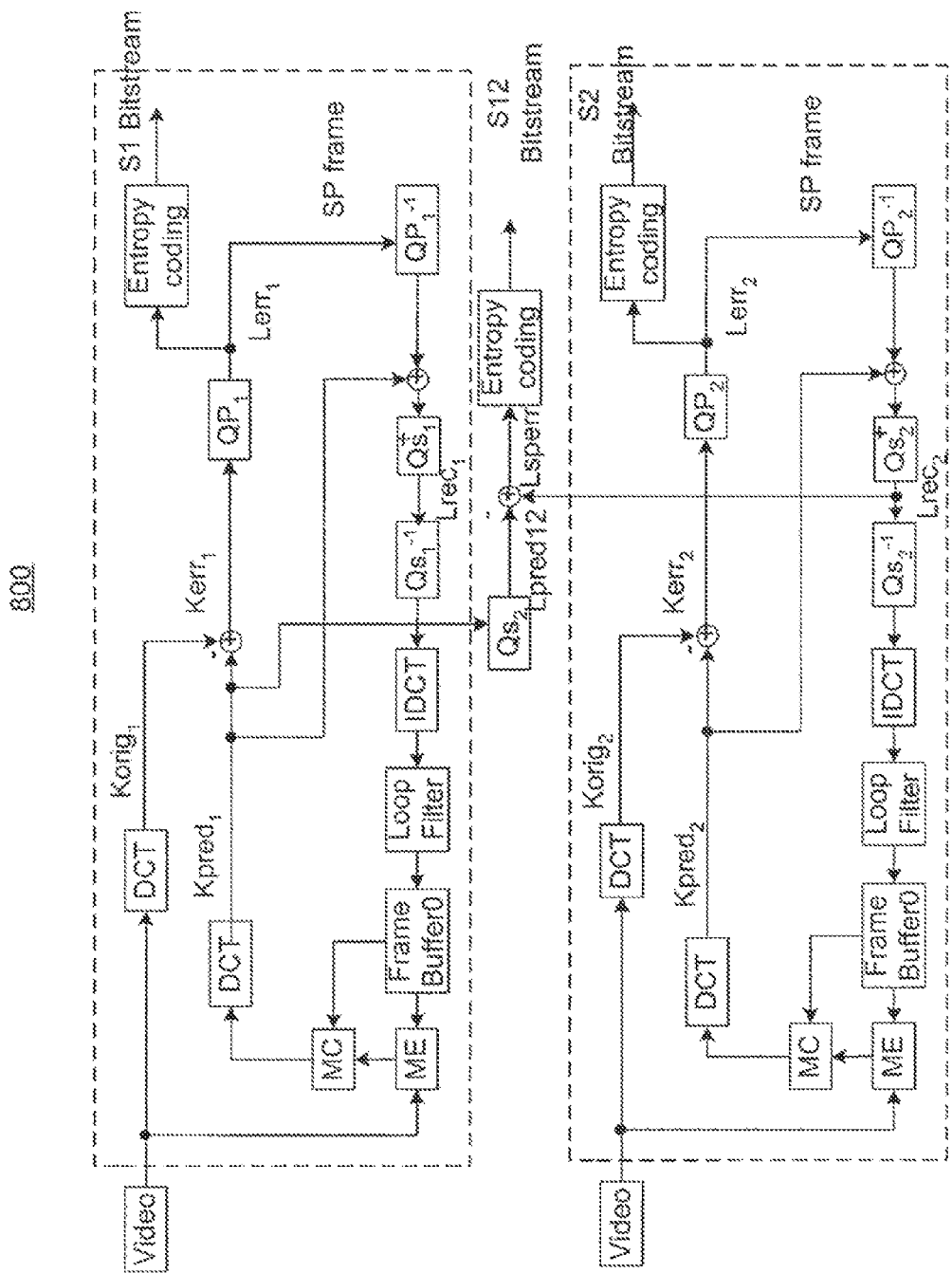
FIG. 8 is block diagram depicting an improved encoder, in accordance with one or more implementations.

In accordance with certain one or more implementations, the improved methods and apparatuses can be further simplified and additional quantization and dequantization processes can be readily removed. For example, FIG. 7 and FIG. 8 illustrate an exemplary decoder and encoder, respectively, that support both high coding efficiency for the normal bitstreams and a compact size for the switching bitstream.

Exemplary Operational Environments:

Turning to the drawings, wherein like reference numerals refer to like elements, Switching Between Streaming Video Bitstreams is illustrated as being implemented in a suitable computing environment. Although not required, Switching Between Streaming Video Bitstreams will be described in the general context of computer-executable instructions, such as program modules, being executed by a personal computer.

Generally, program modules include routines, programs, objects, components, data structures, etc. that perform particular tasks or implement particular abstract data types. Those skilled in the art will appreciate that Switching Between Streaming Video Bitstreams may be practiced with other computer system configurations, including hand-held devices, multi-processor systems, microprocessor based or programmable consumer electronics, network PCs, minicomputers, mainframe computers, portable communication devices, and the like.

Switching Between Streaming Video Bitstreams may also be practiced in distributed computing environments where tasks are performed by remote processing devices that are linked through a communications network. In a distributed computing environment, program modules may be located in both local and remote memory storage devices.

Figure 1:
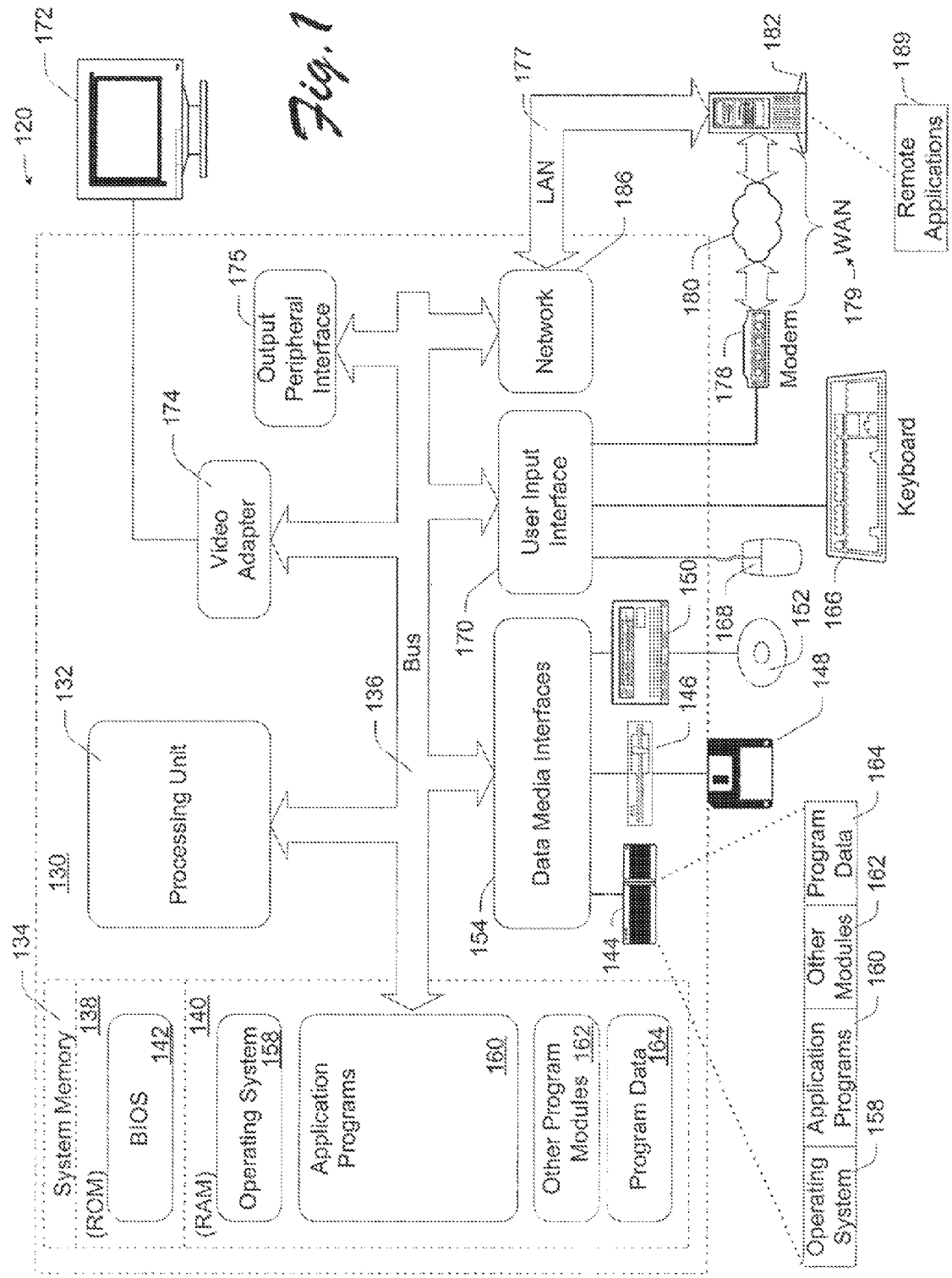
FIG. 1 is a block diagram depicting an exemplary computing environment that is suitable for use with one or more implementations.

FIG. 1 illustrates an example of a suitable computing environment 120 on which the subsequently described systems, apparatuses and methods may be implemented. Exemplary computing environment 120 is only one example of a suitable computing environment and is not intended to suggest any limitation as to the scope of use or functionality of the improved methods and systems described herein. Neither should computing environment 120 be interpreted as having any dependency or requirement relating to any one or combination of components illustrated in computing environment 120.

The improved methods and systems herein are operational with numerous other general purpose or special purpose computing system environments or configurations. Examples of well known computing systems, environments, and/or configurations that may be suitable include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 1, computing environment 120 includes a general-purpose computing device in the form of a computer 130. The components of computer 130 may include one or more processors or processing units 132, a system memory 134, and a bus 136 that couples various system components including system memory 134 to processor 132.

Bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 130 typically includes a variety of computer readable media. Such media may be any available media that is accessible by computer 130, and it includes both volatile and non-volatile media, removable and non-removable media.

In FIG. 1, system memory 134 includes computer readable media in the form of volatile memory, such as random access memory (RAM) 140, and/or non-volatile memory, such as read only memory (ROM) 138. A basic input/output system (BIOS) 142, containing the basic routines that help to transfer information between elements within computer 130, such as during start-up, is stored in ROM 138. RAM 140 typically contains data and/or program modules that are immediately accessible to and/or presently being operated on by processor 132.

Computer 130 may further include other removable/non-removable, volatile/non-volatile computer storage media. For example, FIG. 1 illustrates a hard disk drive 144 for reading from and writing to a non-removable, non-volatile magnetic media (not shown and typically called a "hard drive"), a magnetic disk drive 146 for reading from and writing to a removable, non-volatile magnetic disk 148 (e.g., a "floppy disk"), and an optical disk drive 150 for reading from or writing to a removable, non-volatile optical disk 152 such as a CD-ROM/R/RW, DVD-ROM/R/RW/+R/RAM or other optical media. Hard disk drive 144, magnetic disk drive 146 and optical disk drive 150 are each connected to bus 136 by one or more interfaces 154.

The drives and associated computer-readable media provide nonvolatile storage of computer readable instructions, data structures, program modules, and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 148, optical disk 152, ROM 138, or RAM 140, including, e.g., an operating system 158, one or more application programs 160, other program modules 162, and program data 164.

The improved methods and systems described herein may be implemented within operating system 158, one or more application programs 160, other program modules 162, and/or program data 164.

A user may provide commands and information into computer 130 through input devices such as keyboard 166 and pointing device 168 (such as a "mouse"). Other input devices (not shown) may include a microphone, joystick, game pad, satellite dish, serial port, scanner, camera, etc. These and other input devices are connected to the processing unit 132 through a user input interface 170 that is coupled to bus 136, but may be connected by other interface and bus structures, such as a parallel port, game port, or a universal serial bus (USB).

A monitor 172 or other type of display device is also connected to bus 136 via an interface, such as a video adapter 174. In addition to monitor 172, personal computers typically include other peripheral output devices (not shown), such as speakers and printers, which may be connected through output peripheral interface 175.

Computer 130 may operate in a networked environment using logical connections to one or more remote computers, such as a remote computer 182. Remote computer 182 may include many or all of the elements and features described herein relative to computer 130.

Logical connections shown in FIG. 1 are a local area network (LAN) 177 and a general wide area network (WAN) 179. Such networking environments are commonplace in offices, enterprise-wide computer networks, intranets, and the Internet.

When used in a LAN networking environment, computer 130 is connected to LAN 177 via network interface or adapter 186. When used in a WAN networking environment, the computer typically includes a modem 178 or other means for establishing communications over WAN 179. Modem 178, which may be internal or external, may be connected to system bus 136 via the user input interface 170 or other appropriate mechanism.

Depicted in FIG. 1, is a specific implementation of a WAN via the Internet. Here, computer 130 employs modem 178 to establish communications with at least one remote computer 182 via the Internet 180.

In a networked environment, program modules depicted relative to computer 130, or portions thereof, may be stored in a remote memory storage device. Thus, e.g., as depicted in FIG. 1, remote application programs 189 may reside on a memory device of remote computer 182. It will be appreciated that the network connections shown and described are exemplary and other means of establishing a communications link between the computers may be used.

Exemplary Switching Schemes:

In this section, exemplary encoder and the decoder methods and apparatuses are described in more detail with reference to FIGS. 5-8. For comparison, additional description of the architecture proposed by Kurceren et al is also provided.

The modules and notations used in FIGS. 3-8 are defined as follows:

DCT: Discrete cosine transform.

IDCT: Inverse discrete cosine transform.

Entropy Encoding Entropy encoding of quantized coefficients. It could be arithmetic coding or variable length coding.

Entropy Decoding: Entropy decoding of quantized coefficients. It could be arithmetic decoding or variable length decoding that matches the corresponding modules in the encoder.

Q: Quantization.

$Q^{-1}$: Inverse Quantization or dequantization.

MC: Motion compensation module, where a predicted frame is formed according to the motion vectors and the reference in the frame buffer.

ME: Motion estimation module, where the motion vectors are searched to best predict the current frame.

Loop Filter: A smoothing filter in the motion compensation loop to reduce the blocking artifacts.

FrameBuffer0: A frame buffer that holds the reference frame for next frame encoding/decoding.

P Picture: A frame encoded using traditional motion compensated predictive coding.

SP Picture: A frame encoded as a switching frame using the proposed motion compensated predictive coding.

Switching Bitstream: The bitstream transmitted to make seamless transition from one bitstream to another.

There are some basic assumptions on the quantization and dequantization:

If $L_1 = Q(K_1)$, $Q(Q^{-1}(K_1)) = L_1$;

If $L_1 = Q(K_1)$ and $L_2 = Q(K_2)$, $Q(Q^{-1}(L_1) + Q^{-1}(L_2)) = L_1 + L_2$;

If $L_1 = Q(K_1)$, $Q(Q^{-1}(L_1) + K_2)) = L_1 + Q(K_2)$;

The following descriptions work for the inter-macroblocks in a frame. For intra-macroblocks, a simple "copy" operation can be used.

Reference is now made to the conventional decoding process illustrated, for example, in FIG. 3. Here, the decoding of SP frame S1 or S2 in a normal bitstream is shown. Using S1 as an example, after entropy decoding of the bitstream S1, the levels of the prediction error coefficients, Leal, and motion vectors, are generated for the macroblock. Levels Leal are dequantized using dequantizer $QP_1^{-1}$:

$$K_{serr1} = QP_1^{-1}(L_{err1}).$$

After motion compensation, perform forward DCT transform for the predicted macroblock and obtain $K_{pred1}$, the reconstructed coefficients $K_{rec1}$ are obtained by:

$$K_{rec1} = K_{pred1} + K_{serr1}.$$

The reconstructed coefficients $K_{rec1}$ are quantized by Qs to obtain reconstructed levels $L_{rec1}$, $$L_{rec1} = Qs(K_{rec1}).$$

The levels $L_{rec1}$ are dequantized using $Qs^{-1}$ and the inverse DCT transform is performed to obtain the reconstructed image. The reconstructed image will go through a loop filter to smooth certain blocky artifacts and output to the display and to the frame buffer for the next frame decoding.

When decoding of switching bitstream S12, e.g., when switching from bitstream 1 to bitstream 2, the decoding process is the same as the decoding of S1, except that the input is bitstream S12, $QP_1^{-1}$ is replaced by $Qs^{-1}$, $K_{serr1}$ is replaced by $K_{serr12}$, $L_{rec1}$ is replaced by $L_{rec2}$, $K_{rec1}$ is replaced by $K_{rec12}$, and $L_{err1}$ is replaced by $L_{err12}$.

The resultant picture is the same as that decoded from S2. Thus a drifting-free switching from bitstream 1 to bitstream 2 is achieved. Qs is encoded in the S12 bitstream.

Reference is now made to FIG. 4 and the exemplary conventional encoding process that is illustrated for encoding of SP frame S1 or S2 in a normal bitstream. Here, S1 is used as an example.

DCT transform to the macroblock of the original video is performed, and the obtained coefficients as $K_{orig1}$ denoted.

After motion compensation, a DCT transform is performed to the predicted macroblock, and the obtained coefficients as $K_{pred1}$ denoted. The next step is to quantize $K_{pred1}$ using Qs and obtain levels $L_{pred1}$.

$$L_{pred1} = Qs(K_{pred1}).$$

Then dequantize $L_{pred1}$ using dequantizer $Qs^{-1}$, $K_{spred1} = Qs^{-1}(L_{pred1})$ and subtract $K_{spred1}$ from $K_{orig1}$ to obtain error coefficients $K_{err1}$, $$K_{err1} = K_{orig1} - K_{pred1}.$$

Then quantize $K_{err1}$ using $QP_1$ and obtain error levels $L_{err1}$, $$L_{err1} = QP_1(K_{err1}).$$

Next, perform entropy encoding on $L_{err1}$ and obtain bitstream S1. Using the S1 decoder described above, for example, reconstruct levels $L_{rec1}$ and the reference for the next frame encoding. Note that in this example there is a quantizer Qs and a dequantizer $Qs^{-1}$ in the reconstruction loop.

Notice that there is a mismatch between prediction reference and reconstruction reference in this scheme. The encoding of switching bitstream S12 (switching from bitstream 1 to bitstream 2). The encoding of S12 is based on the encoding of S1 and S2. $L_{pred1}$ is subtracted by the S1 encoder from the reconstructed level $L_{rec2}$ in S2 encoder.

$$L_{err12} = L_{rec2} - L_{pred1}.$$

Entropy encoding is performed with $L_{err12}$ and bitstream S12.

An improved decoding process 500 of FIG. 5, in accordance with one or more implementations will now be descried in greater detail.

To describe the decoding of SP frame S1 or S2 in a normal bitstream, S1 is used as an example. After entropy decoding of the bitstream S1, the levels of the prediction error coefficients, $L_{err1}$, and motion vectors, are generated for the macroblock. Levels $L_{err1}$ are dequantized using quantizer $QP_1^{-1}$, $$K_{serr1} = QP_1^{-1}(L_{err1}).$$

The error coefficients $K_{serr1}$ are quantized using quantizer $Qs = Qs_1$ and obtain levels, $$L_{serr1} = Qs(K_{serr1}).$$

After motion compensation, forward DCT transform is performed for the predicted macroblock and obtain $K_{pred1}$. $K_{pred1}$ is then quantized by $Qs_1$, $$L_{pred1} = Qs_1(K_{pred1}).$$

$L_{pred1}$ is then dequantized by $Qs_1^{-1}$, $$K_{spred1} = Qs_1^{-1}(L_{pred1}).$$

The dequantized coefficients $K_{spred1}$ are further quantized by quantizer $Qs = Qs_1$ and obtain levels, $$L_{spred1} = Qs(K_{spred1}).$$

The reconstructed levels $L_{rec1}$ are obtained by, $$L_{rec1} = L_{spred1} + L_{serr1}.$$

The levels $L_{rec1}$ are dequantized using $Qs^{-1} = Qs_1^{-1}$ and the inverse DCT transform is performed to obtain the reconstructed image. The reconstructed image will go through a loop filter to smooth certain blocky artifacts and output to the display and to the frame buffer for next frame decoding.

The decoding of switching bitstream S12, for example, when switching from bitstream 1 to bitstream 2, follows a similar decoding process similar except that the input is bitstream S12, $QP_1^{-1}$ is replaced by $Qs_2^{-1}$, Qs is replaced by $Qs_2$, $Qs^{-1}$ is replaced by $Qs_2^{-1}$, $L_{rec1}$ is replaced by $L_{rec2}$, $L_{rec1}$, $L_{err1}$ is replaced by $L_{err12}$, $K_{serr1}$ is replaced by $K_{serr12}$, and $L_{spred1}$ is replaced by $L_{spred12}$.

Note that the information on $Qs_1$ and $Qs_2$ is encoded in bitstream S12.

The resultant picture is the same as that decoded from S2. Thus a drifting-free switching from bitstream 1 to bitstream 2 is achieved.

An improved encoding process 600 of FIG. 6, in accordance with one or more implementations will now be descried in greater detail.

To describe the encoding of SP frame S1 or S2 in a normal bitstream, S1 is used as an example. Here, for example, DCT transform is performed to the macroblock of the original video, and the obtained coefficients as $K_{orig1}$ denoted.

After motion compensation, DCT transform is performed to the predicted macroblock, and the obtained coefficients denoted as $K_{pred1}$. Then $K_{pred1}$ is quantized using $Qs_1$ and levels $L_{pred1}$ obtained, $$L_{pred1} = Qs_1(K_{pred1}).$$

Then, the next step is to dequantize $L_{pred1}$ using dequantizer $Qs_1^{-1}$, $$K_{spred1} = Qs_1^{-1}(L_{pred1})$$

Then subtract $K_{spred1}$ from $K_{orig1}$ and obtain error coefficients $K_{err1}$, $$K_{err1} = K_{orig1} - K_{pred1}.$$

Next, quantize $K_{err1}$ using $QP_1$ and obtain error levels $L_{err1}$, $$L_{err1} = QP_1(K_{err1}).$$

Then, perform entropy encoding on $L_{err1}$ and obtain bitstream S1.

Using the S1 decoder described above, for example, reconstruct levels $L_{rec1}$ and the reference for the next frame encoding.

Note that here there is a quantizer $Qs_1$ and a dequantizer $Qs_1^{-1}$ in the reconstruction loop.

The encoding of switching bitstream S12, for example, when switching from bitstream 1 to bitstream 2, is based on the encoding of S1 and S2.

Here, the process involves quantizing prediction coefficients $K_{spred1}$ in the S1 encoder using quantizer $Qs_2$.

$$L_{spred12} = Qs_2(K_{spred1}).$$

Then subtract $L_{spred12}$ from the reconstructed level $L_{rec2}$ in S2 encoder.

$$L_{err12} = L_{rec2} - L_{spred12}.$$

Next, perform entropy encoding of $L_{err12}$ and generate bitstream S12.

An improved decoding process 700 of FIG. 7, in accordance with one or more implementations will now be descried in greater detail.

To describe the decoding of SP frame S1 or S2 in a normal bitstream, S1 is used as an example.

Here, after entropy decoding of the bitstream S1, the levels of the prediction error coefficients, $L_{err1}$, and motion vectors, are generated for the macroblock. Levels $L_{err1}$ are dequantized using quantizer $QP_1^{-1}$:

$$K_{serr1} = QP_1^{-1}(L_{err1}).$$

After motion compensation, perform forward DCT transform for the predicted macroblock and obtain $K_{pred1}$, the reconstructed coefficients $K_{rec1}$ are obtained by:

$$K_{rec1} = K_{pred1} + K_{serr1}.$$

The reconstructed coefficients $K_{rec1}$ are quantized by $Qs_1$ to obtain reconstructed levels $L_{rec1}$, $$L_{rec1} = Qs_1(K_{rec1}).$$

The levels $L_{rec1}$ are dequantized using $Qs_1^{-1}$ and the inverse DCT transform is performed to obtain the reconstructed image. The reconstructed image will go through a loop filter to smooth certain blocky artifacts and output to the display and to the frame buffer for next frame decoding.

The decoding of switching bitstream S12, for example, when switching from bitstream 1 to bitstream 2, follows a similar decoding process similar except that the input is bitstream S12, $QP_1^{-1}$ is replaced by $Qs_2^{-1}$, $Qs_1$ is replaced by $Qs_2$, $Qs_1^{-1}$ is replaced by $Qs_2^{-1}$, $K_{serr1}$ is replaced by $K_{serr12}$, $K_{rec1}$ is replaced by $K_{rec12}$, $L_{rec1}$ is replaced by $L_{rec2}$, and $L_{err1}$ is replaced by $L_{err12}$.

The resultant picture is the same as that decoded from S2. Thus, a drifting-free switching from bitstream 1 to bitstream 2 is achieved.

An improved encoding process 800 of FIG. 8, in accordance with one or more implementations will now be descried in greater detail.

To describe the encoding of SP frame S1 or S2 in a normal bitstream, S1 is used as an example.

Here, DCT transform is performed to the macroblock of the original video, and the obtained coefficients as $K_{orig1}$ denoted Next, after motion compensation, DCT transform is performed to the predicted macroblock, and the obtained coefficients as $K_{pred1}$ denoted.

Then the process includes subtracting $K_{pred1}$ from $K_{orig1}$ and obtaining error coefficients $K_{err1}$.

$$K_{err1} = K_{orig1} - K_{pred1}.$$

Next, $K_{err1}$ is quantized using $QP_1$ and error levels $L_{err1}$ obtained, $$L_{err1} = QP_1(K_{err1}).$$

Then entropy encoding is performed on $L_{err1}$ and bitstream S1 obtained.

Using the S1 decoder described above, for example, the process includes reconstructing levels $L_{rec1}$ and the reference for the next frame encoding. Note that here there is a quantizer $Qs_1$ and a dequantizer $Qs_1^{-1}$ in the reconstruction loop.

The encoding of switching bitstream S12, for example, when switching from bitstream 1 to bitstream 2, is based on the encoding of S1 and S2.

For example, prediction coefficients $K_{pred1}$ are quantized in the S1 encoder using quantizer $Qs_2$, $$L_{pred12} = Qs_2(K_{pred1}).$$

Then the process includes subtracting $L_{pred12}$ from the reconstructed level $L_{rec2}$ in S2 encoder.

$$L_{err12} = L_{rec2} - L_{pred12}.$$

Next entropy encoding of $L_{err12}$ is performed and bitstream S12 generated.

Figure 9:
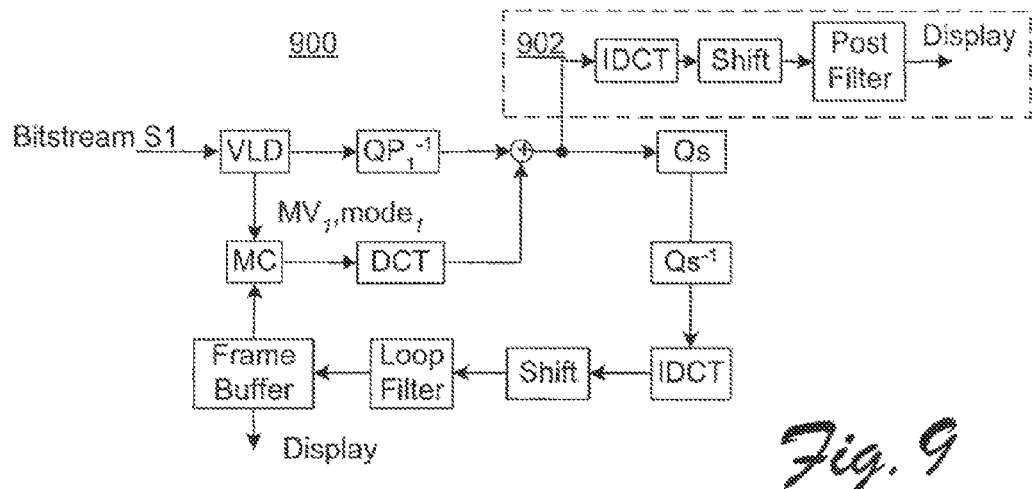
FIG. 9 is block diagram depicting an improved decoder, in accordance with one or more implementations.

Reference is now made to FIG. 9, which is a block diagram depicting a decoder 900 for S1 and S2, in accordance with one or more implementations. Here, it is noted that the quantization Qs is operated on the reconstructed DCT reference rather than on the decoded DCT residue and the DCT prediction. The quantization in this example can be described as:

$$Y = [X * A(Qs) + 2^{19}]/2^{20},$$

where X is the reconstructed DCT coefficient, and Y is the quantized DCT coefficient. $A(\cdot)$ is the quantization table. Qs is the quantization step.

If merging the dequantization QP and quantization QS in one step, the operation can, for example, be formularized as $$L_{rec} = \frac{\left[K_{pred}(i,j) + L_{err}(i,j) * \frac{(2^{20} + A(Qp)/2)}{A(Qp)}\right] * A(Qs) + 2^{19}}{2^{20}},$$

where $L_{err}$ are the levels of the prediction error coefficients, $K_{pred}$ are prediction coefficients. This is quite different from that used in conventional SP coding. One advantage is that a high quality display can be reconstructed from the part in [ . . . ] of the above formula.

Therefore, decoder 900 provides two ways for reconstructing the display image. In the first case, the reconstructed reference is directly used for the purpose of display. There is little if any complexity increase in this case. In the second case, if the decoder is powerful enough, another high quality image can be reconstructed for display. This process includes the modules within box 902. These modules are, for example, non-normative parts for the current JVT standard.

Figure 10:
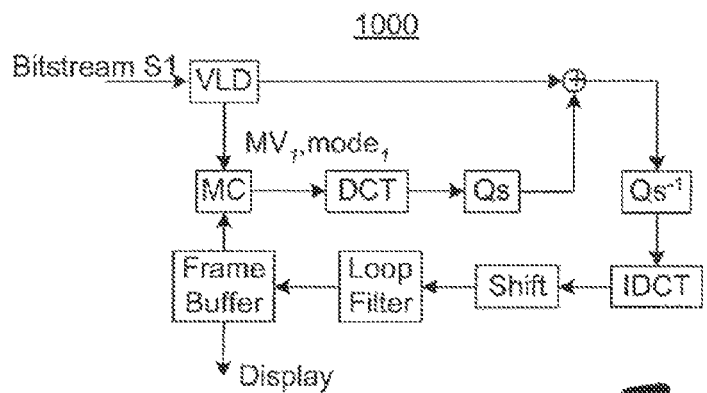
FIG. 10 is block diagram depicting an improved decoder, in accordance with one or more implementations.

FIG. 10 illustrates a decoder 1000 for the switching bitstream S12, in accordance with certain further implementations. In this example, decoder 1000 for the switching bitstream S12 is slightly different from that for S1 and S2, presented in previous sections. Here, for example, the quantization Qs is only needed on the DCT prediction. Again, the quantization in this example can be described as:

$$Y = [X * A(Qs) + 2^{19}]/2^{20}.$$

Decoder 1000 is configured to know which SP bitstream is received. Therefore, for example, a 1-bit syntax can be employed to notify decoder 1000. An exemplary modification in the SP syntax and semantic include a Switching Bitstream Flag (e.g., 1 bit) and Quantization parameter (e.g., 5 bits).

Thus, for example, when Ptype indicates an SP frame, the 1-bit syntax element "Switching Bitstream Flag" is inserted before the syntax element "Slice Qp". Here, when the Switching Bitstream Flag is 1, the current bitstream is decoded as Bitstream S12, and the syntax element "Slice QP" is skipped; otherwise it is decoded as Bitstream S1 or S2, and the syntax element "Slice QP" is the quantization parameter Qp.

When Ptype indicates a SP frame, the syntax element "SP Slice QP" is inserted after the syntax element "Slice QP" to encode the quantization parameter Qs.

Figure 11:
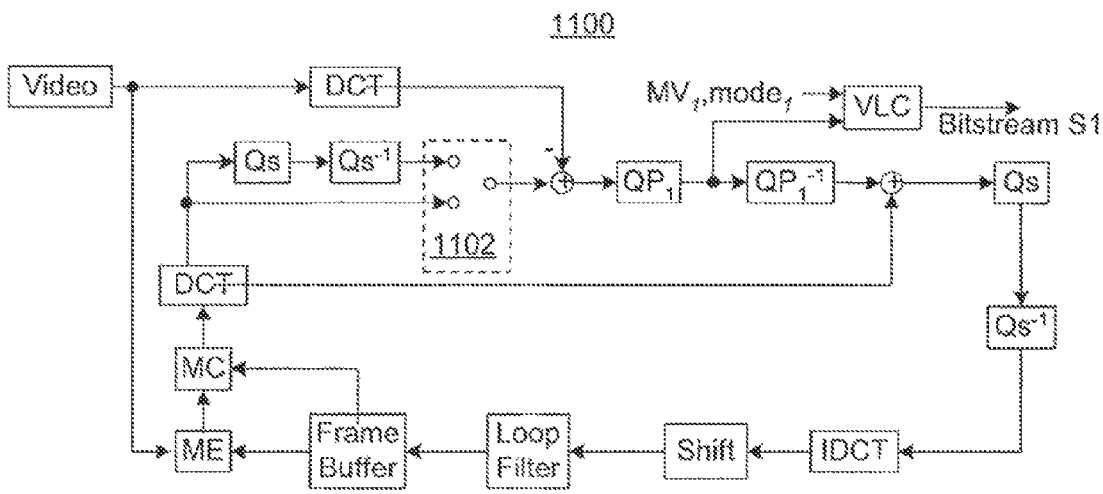
FIG. 11 is block diagram depicting an improved encoder, in accordance with one or more implementations.

An encoder 1100 is illustrated in the block diagram of FIG. 11, in accordance with one or more implementations.

Here, for example, encoder 1100 includes a switch 1102. Thus, the DCT prediction can be directly subtracted from the original DCT image without quantization and dequantization, or the DCT prediction can be subtracted from the original DCT image after quantization and dequantization. Whether the DCT prediction is quantized or not can be decided, for example, one by one coefficient with rate-distortion criterion.

Thus, several exemplary improved SP picture coding methods and apparatuses have been presented. Separate Qs can be provided for up-switching and down-switching bitstreams. The Qs for switching bitstream coding can be decoupled from the prediction and reconstruction loop. This eliminates the contradiction of reducing switching bitstream size and improving coding efficiency of the normal bitstreams, for example. There can also be significant reduction in the switching bitstream size while maintaining the high coding efficiency of the normal bitstreams by optimizing different Qs independently. Some Quantization/Dequantization processes can be removed in accordance with certain implementations to improve coding efficiency. Coding efficiently can also be improved by using the same reference for prediction and reconstruction. The methods and apparatuses may also be configured to allow for more down-switching points than up-switching points.

CONCLUSION

Although the description above uses language that is specific to structural features and/or methodological acts, it is to be understood that Switching Between Streaming Video Bitstreams defined in the appended claims is not limited to the specific features or acts described. Rather, the specific features and acts are disclosed as exemplary forms of implementing Switching Between Streaming Video Bitstreams.

What is claimed is:

1. In a computing system that implements a video decoder, a method comprising:
receiving encoded data for a video frame, the encoded data including a flag that indicates whether the encoded data is to be decoded as a switching bitstream;
decoding the encoded data to reconstruct the video frame, wherein:
if the flag indicates the encoded data is not to be decoded as a switching bitstream, the decoding of the encoded data to reconstruct the video frame uses a first quantization parameter (QP) for inverse quantization of quantized transform coefficients for prediction error values and uses a second quantization parameter (QS) different than the first quantization parameter (QP) for quantization and inverse quantization of reconstructed coefficients; and
otherwise, the flag indicating the encoded data is to be decoded as a switching bitstream, the decoding of the encoded data to reconstruct the video frame uses the second quantization parameter (QS) for quantization of transform coefficients for motion-compensated predictions; and
buffering the reconstructed video frame in a frame buffer.

2. The method of claim 1 wherein, if the flag indicates the encoded data is not to be decoded as a switching bitstream, the decoding of the encoded data to reconstruct the video frame includes:
transforming the motion-compensated predictions into the transform coefficients for the motion-compensated predictions;
entropy decoding the quantized transform coefficients for the prediction error values;
inverse quantizing the quantized transform coefficients for the prediction error values using the first quantization parameter (QP);
adding the transform coefficients for the motion-compensated predictions and the transform coefficients for the prediction error values, resulting in the reconstructed coefficients;
quantizing then inverse quantizing the reconstructed coefficients using the second quantization parameter (QS); and
inverse transforming the inverse quantized reconstructed coefficients.

3. The method of claim 2 wherein the decoding of the encoded data to reconstruct the video frame further includes:
performing loop filtering to reduce blocking artifacts;
wherein the reconstructed video frame is buffered in the frame buffer for use as a reference frame in motion compensation.

4. The method of claim 2 further comprising:
outputting the reconstructed video frame for display.

5. The method of claim 1 wherein, if the flag indicates the encoded data is to be decoded as a switching bitstream, the decoding of the encoded data to reconstruct the video frame includes:
transforming the motion-compensated predictions into the transform coefficients for the motion-compensated predictions;
quantizing the transform coefficients for the motion-compensated predictions using the second quantization parameter (QS);
entropy decoding the quantized transform coefficients for the prediction error values;
adding the quantized transform coefficients for the motion-compensated predictions and the quantized transform coefficients for the prediction error values, resulting in quantized reconstructed coefficients;
inverse quantizing the quantized reconstructed coefficients using the second quantization parameter (QS); and
inverse transforming the inverse quantized reconstructed coefficients.

6. The method of claim 5 wherein the decoding of the encoded data to reconstruct the video frame further includes:
performing loop filtering to reduce blocking artifacts;
wherein the reconstructed video frame is buffered in the frame buffer for use as a reference frame in motion compensation.

7. The method of claim 1 wherein the encoded data for the video frame includes a slice QP syntax element, and wherein the first quantization parameter (QP) depends on the slice QP syntax element.

8. The method of claim 7 wherein the encoded data for the video frame further includes a SP slice QP syntax element, and wherein the second quantization parameter (QS) depends on the SP slice QP syntax element.

9. One or more computer-readable media storing computer-executable instructions for causing a computing system programmed thereby to perform operations, wherein the one or more computer-readable media are selected from the group consisting of non-volatile memory, non-volatile magnetic media, and non-volatile optical media, the operations comprising:
receiving encoded data for a video frame, the encoded data including a flag that indicates whether the encoded data is to be decoded as a switching bitstream;
decoding the encoded data to reconstruct the video frame, wherein:
if the flag indicates the encoded data is not to be decoded as a switching bitstream, the decoding of the encoded data to reconstruct the video frame uses a first quantization parameter (QP) for inverse quantization of quantized transform coefficients for prediction error values and uses a second quantization parameter (QS) different than the first quantization parameter (QP) for quantization and inverse quantization of reconstructed coefficients; and otherwise, the flag indicating the encoded data is to be decoded as a switching bitstream, the decoding of the encoded data to reconstruct the video frame uses the second quantization parameter (QS) for quantization of transform coefficients for motion-compensated predictions; and buffering the reconstructed video frame in a frame buffer.

10. The one or more computer-readable media of claim 9 wherein, if the flag indicates the encoded data is not to be decoded as a switching bitstream, the decoding of the encoded data to reconstruct the video frame includes:

transforming the motion-compensated predictions into the transform coefficients for the motion-compensated predictions;

entropy decoding the quantized transform coefficients for the prediction error values;

inverse quantizing the quantized transform coefficients for the prediction error values using the first quantization parameter (QP);

adding the transform coefficients for the motion-compensated predictions and the transform coefficients for the prediction error values, resulting in the reconstructed coefficients;

quantizing then inverse quantizing the reconstructed coefficients using the second quantization parameter (QS); and inverse transforming the inverse quantized reconstructed coefficients.

11. The one or more computer-readable media of claim 10 wherein the decoding of the encoded data to reconstruct the video frame further includes:

performing loop filtering to reduce blocking artifacts;

wherein the reconstructed video frame is buffered in the frame buffer for use as a reference frame in motion compensation.

12. The one or more computer-readable media of claim 10 wherein the operations further include:

outputting the, reconstructed video frame for display.

13. The one or more computer-readable media of claim 9 wherein, if the flag indicates the encoded data is to be decoded as a switching bitstream, the decoding of the encoded data to reconstruct the video frame includes:

transforming the motion-compensated predictions into the transform coefficients for the motion-compensated predictions;

quantizing the transform coefficients for the motion-compensated predictions using the second quantization parameter (QS);

entropy decoding the quantized transform coefficients for the prediction error values;

adding the quantized transform coefficients for the motion-compensated predictions and the quantized transform coefficients for the prediction error values, resulting in quantized reconstructed coefficients;

inverse quantizing the quantized reconstructed coefficients using the second quantization parameter (QS); and inverse transforming the inverse quantized reconstructed coefficients.

14. The one or more computer-readable media of claim 13 wherein the decoding of the encoded data to reconstruct the video frame further includes:

performing loop filtering to reduce blocking artifacts;

wherein the reconstructed video frame is buffered in the frame buffer for use as a reference frame in motion compensation.

15. The one or more computer-readable media of claim 9 wherein the encoded data for the video frame includes a slice QP syntax element, and wherein the first quantization parameter (QP) depends on the slice QP syntax element.

16. The one or more computer-readable media of claim 15 wherein the encoded data for the video frame further includes a SP slice QP syntax element, and wherein the second quantization parameter (QS) depends on the SP slice QP syntax element.

17. A computing system comprising a processor and memory, wherein the computing system is configured to perform operations comprising:

receiving encoded data for a video frame, the encoded data including a flag that indicates whether the encoded data is to be decoded as a switching bitstream;

decoding the encoded data to reconstruct the video frame, wherein:

if the flag indicates the encoded data is not to be decoded as a switching bitstream, the decoding of the encoded data to reconstruct the video frame uses a first quantization parameter (QP) for inverse quantization of quantized transform coefficients for prediction error values and uses a second quantization parameter (QS) different than the first quantization parameter (QP) for quantization and inverse quantization of reconstructed coefficients; and otherwise, the flag indicating the encoded data is to be decoded as a switching bitstream, the decoding of the encoded data to reconstruct the video frame uses the second quantization parameter (QS) for quantization of transform coefficients for motion-compensated predictions; and buffering the reconstructed video frame in a frame buffer.

18. The computing system of claim 17 wherein, if the flag indicates the encoded data is not to be decoded as a switching bitstream, the decoding of the encoded data to reconstruct the video includes:

transforming the motion-compensated predictions into the transform coefficients for the motion-compensated predictions;

entropy decoding the quantized transform coefficients for the prediction error values;

inverse quantizing the quantized transform coefficients for the prediction error values using the first quantization parameter (QP);

adding the transform coefficients for the motion-compensated predictions and the transform coefficients for the prediction error values, resulting in the reconstructed coefficients;

quantizing then inverse quantizing the reconstructed coefficients using the second quantization parameter (QS); and inverse transforming the inverse quantized reconstructed coefficients.

19. The computing system of claim 17 wherein, if the flag indicates the encoded data is to be decoded as a switching bitstream, the decoding of the encoded data to reconstruct the video includes:

transforming the motion-compensated predictions into the transform coefficients for the motion-compensated predictions;

quantizing the transform coefficients for the motion-compensated predictions using the second quantization parameter (QS);

entropy decoding the quantized transform coefficients for the prediction error values;

adding the quantized transform coefficients for the motion-compensated predictions and the quantized transform coefficients for the prediction error values, resulting in quantized reconstructed coefficients;

inverse quantizing the quantized reconstructed coefficients using the second quantization parameter (QS); and inverse transforming the inverse quantized reconstructed coefficients.

20. The computing system of claim 17 wherein the encoded data for the video frame includes a slice QP syntax element and a SP slice QP syntax element, wherein the first quantization parameter (QP) depends on the slice QP syntax element, and wherein the second quantization parameter (QS) depends on the SP slice QP syntax element.

\* \* \* \* \*